United States Patent [19]

Testardi

[11] Patent Number: 5,761,409

[45] Date of Patent: Jun. 2, 1998

[54] PASSIVE BUS MONITOR DETECTS DATA CORRUPTION FOR BLOCK-ORIENTED DATA STORAGE

[75] Inventor: Rich P. Testardi, Ft. Collins, Colo.

[73] Assignee: Hewlett-Packard Company, Palo Alto, Calif.

[21] Appl. No.: 558,574

[22] Filed: Oct. 31, 1995

[51] Int. Cl.⁶ .................................................. H03M 3/00
[52] U.S. Cl. ........................... 395/183.15; 371/37.7
[58] Field of Search ............................ 364/514 C, 574;
371/37.7, 40.4, 57.1, 67.1; 395/182.04,
182.19, 189.19, 184.01, 185.01, 185.05,
180, 185.09, 183.15

[56] References Cited

U.S. PATENT DOCUMENTS 5,359,659 10/1994 Rosenthal ............................ 380/4
5,488,702 1/1996 Byers et al. ......................... 395/186

Primary Examiner—James P. Trammell
Assistant Examiner—Thomas Peeso
Attorney, Agent, or Firm—Edward L. Miller

[57] ABSTRACT

A monitor passively observes traffic on a bus connecting a computer with a block-oriented mass storage device, such as a disc. The monitor parses the traffic on the bus to identify read and write operations and the bus address/block address they are intended for. The monitor creates an original confidence indicator for writes, which it then stores in a memory of its own. The memory location at which the original confidence indicator is stored is defined by a data structure indexed by the bus address/block address combination. When at a later time that same bus address/block address is read from, the monitor creates a comparison confidence indicator from data being sent from the block-oriented mass storage device to the computer, retrieves the corresponding original confidence indicator from the data structure in its memory, and compares the two. If they do not match there has been data corruption and an appropriate indication is issued to the bus or the computer.

3 Claims, 3 Drawing Sheets

PASSIVE BUS MONITOR DETECTS DATA CORRUPTION FOR BLOCK-ORIENTED DATA STORAGE

BACKGROUND OF THE INVENTION

Discs and other mass storage devices are connected to the computer that controls them by collections of conductors representing commands, data and status information. Such a collection is generally called a bus. Examples of busses include SCSI and HPIB (IEEE 488). These are electrical busses, but a similar sort of thing also exists using optical conductors of light. In any event, it is typical that the traffic transmitted over the bus to store and then later retrieve data from a mass storage device, such as a disc, does not include any form of error detection, or confidence indication. That is, the instructions, addresses and data are all transmitted without benefit of parity, checksums, or cyclic redundancy checks (CRC). This is generally done in the name of economy and performance with the expectation that traffic on the bus is robust and that errors caused by marginal signal levels and by crosstalk are infrequent.

Bus definitions frequently include more than mere specifications concerning signal levels and their timing. At a higher level of abstraction there are issues of protocol. These concern what sequences of bus traffic items are appropriate. An analogy might be that if a person is correctly asked where he lives, he should not reply with the time of day he next expects to eat breakfast. Should such a thing happen, we would not blame garbled speech or a noisy environment; we would instead seek an explanation in another set of rules and expectations concerning the interpretation of correctly communicated symbols. To return to busses and their controlling mechanisms, the systems that originate and respond to bus traffic are often complex, and sometimes some of them get confused. As far as the performance of the overall system is concerned, however, it is still an error just as much as if bad data arose due to crosstalk.

Given the standardization of certain popular bus definitions, such as SCSI, and given their associated protocols, all coupled with the proliferation of manufacturers of mass produced and low cost drives, certain problems occur with sufficient frequency to warrant a solution.

The desire of the various manufacturers to reduce costs has complicated the issues of ensuring enough margin in signal size, timing and crosstalk, especially since it is quite common for equipment from different manufacturers to be in use along the bus. Each believes that his equipment is in conformance with the published standard, and perhaps it is. Nevertheless, given that there can be many complex devices on the bus, each interpreting a complex repertoire of commands, there is ample opportunity for margin issues, and just plain bugs in the controlling firmware in the device's embedded system, to create errors. These errors may change data in subtle ways that are not detected until later, if at all.

Once errors are detected in a particular system, there may arise a difficulty, or even a dispute, concerning the determination of whose equipment was/is at fault. For example, a manufacturer of computers may be testing disc drives from various sources to qualify them for use in systems sold by that computer manufacturer. A rather large and complicated test suite of hardware and software may be in use. The maker of the disc drive may not take kindly to his product being accused of malfunction, and decline the suggestion that it needs to be fixed. It would help a great deal in the search for justice concerning the question of "Who did it?" if there were some irrefutable evidence available that indicates the correctness (or otherwise) of the data associated with the various transactions conducted over the bus. It might then even be possible to interrupt an ongoing transaction gone awry to allow inspection to locate a "smoking gun" that is conclusive of guilt. At the very least, it would be possible to examine a record of the transactions to determine which side of a transaction or operation was suspect.

SUMMARY OF THE INVENTION

A monitor passively observes traffic on a bus connecting a computer with a block-oriented mass storage device, such as a disc. The monitor parses the traffic on the bus to identify read and write operations and the bus address/block address they are intended for. The monitor creates an original confidence indicator for writes, which it then stores in a memory of its own. The memory location at which the original confidence indicator is stored is defined by a data structure indexed by the bus address/block address combination. When at a later time that same bus address/block address is read from, the monitor creates a comparison confidence indicator from data being sent from the block-oriented mass storage device to the computer, retrieves the corresponding original confidence indicator from the data structure in its memory, and compares the two. If they do not match there has been data corruption and an appropriate indication is issued to the bus or the computer.

DETAILED DESCRIPTION OF THE INVENTION

Figure 1:
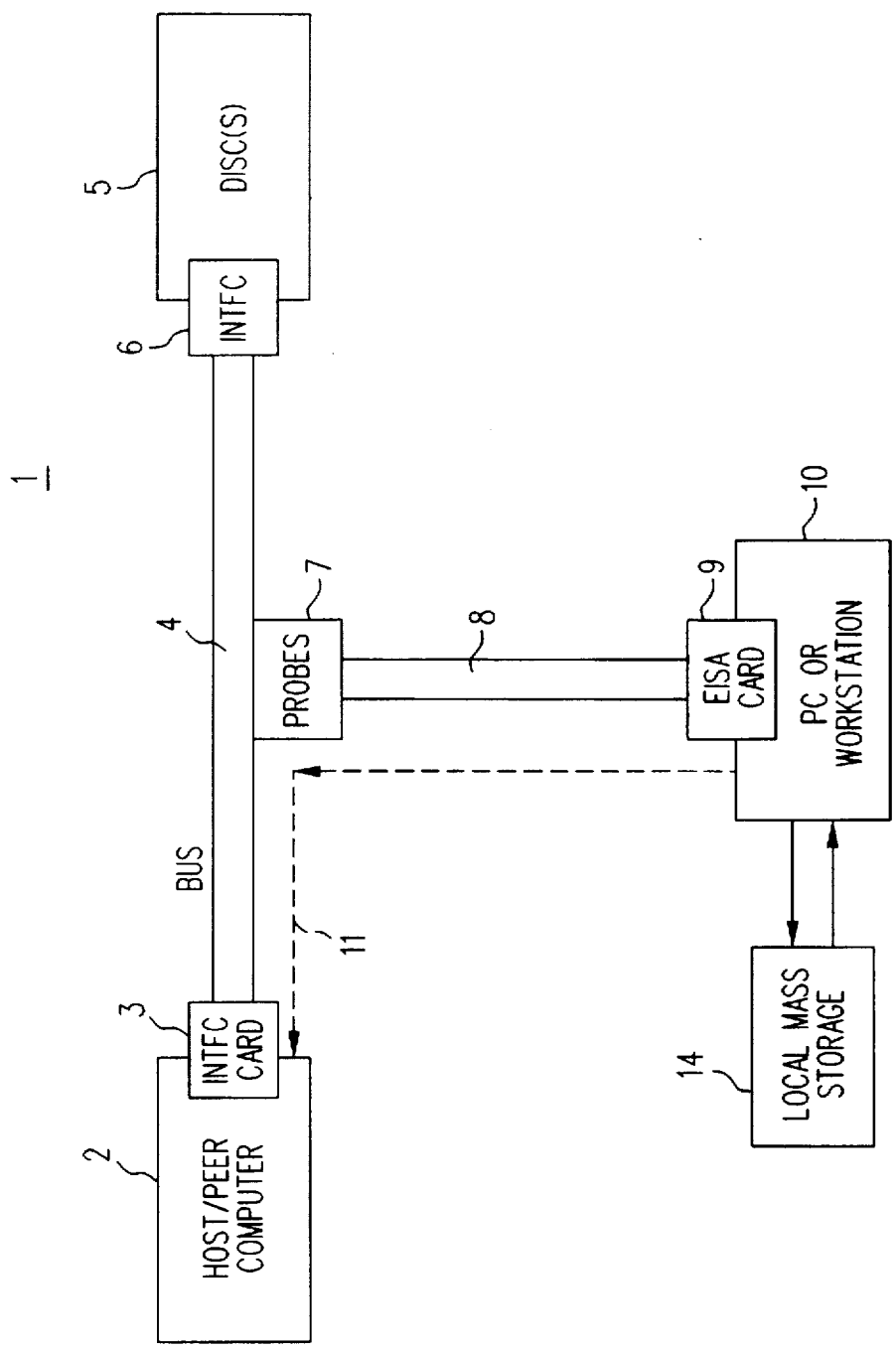
FIG. 1 is a simplified block diagram of a passive bus monitor that detects data corruption for block-oriented data storage.

Refer now to FIG. 1, wherein is shown a simplified block diagram 1 of an arrangement of computer equipment whose bus is passively monitored for data corruption. In particular, a computer 2, which may be a stand-alone host, or a peer on a network, is coupled by an interface card 3 to a bus 4. The bus 4 could be a SCSI bus. At another location on the bus 4 is a block-oriented mass storage device, such as a disc drive 5, which in turn is coupled to the bus 4 through an interface 6. Traffic on the bus 4 will be in accordance with whatever application is being run, the nature of its data, the activities of the space manager (the file system for the operating system in use), the command set for the particular disc in use, and the protocols associated with the bus.

A disc incorporates an addressing mechanism; e.g., what surface, what track or cylinder, which sector, or perhaps a block number that the disc controller internally maps into surface, track and sector. It is a property of the technology of discs that the fundamental operations on data are to read and write complete sectors. A desire to touch one byte somewhere in a sector entails handling the entire sector. It is this property that leads to discs being described as "block-oriented" devices. For our present purpose, when it is in reference to a disc, the term "block" can be taken to mean (a corresponding particular) "sector".

Typically, the space manager maintains a data structure whose content is a linked list of addresses within the disc, with the list indexed according to file names. This is how the file manager is able to decide where to put new data onto the disc without clobbering existing data, as well as how it knows were to look to retrieve existing data. Because of this it is possible to observe within the traffic on the bus 4 combinations of read or write commands, the disc addresses associated therewith, and complete blocks of the data that is sent to the disc for writing or returned to the computer 2 after reading.

The salient point is that the typical use of a disc is not like a half-inch nine track magnetic tape, where the operating system says "Here, write this stuff next from whatever is the current position of the tape." First, even though the tape drive may write an inter-block gap or some other tape mark to delimit a location on the tape, only the application keeps track of which block is under the head. (Tapes don't generally have space managers, or operate as part of a file system.) Second, (tape) blocks are simply whatever gets written between marks, and there exists a finer grained unit of data transfer called the record. Records can be of arbitrary size (and may well contain checksum or CRC bits that have been added by the driver). Thus, tapes are not "block-oriented" devices in the same sense that discs are.

As stated above, it is thus possible to observe within the traffic on bus 4 read and write commands, the associated block addresses and their blocks of data. The content of a block that is written should be identical to that of that same block when it is later read. For the situation to be otherwise would mean that the storage process has corrupted the data in the block. The plan is to passively monitor with an independent mechanism (we'll call it the "monitor") bus traffic and identify any write operation. Each block of data associated with that write operation is observed, and an original checksum or CRC (or other original confidence indicator) is created by the monitor. The monitor then stores in its own private medium a data pair consisting of the block address and the original confidence indicator. When at a later time that block is read, the monitor retrieves the original confidence indicator for that block and uses the observed retrieved blocks of data to create comparison confidence indicators for those blocks. The comparison confidence indicators had better match their corresponding original confidence indicators; for if they don't then the data has been corrupted somehow. The monitor then notifies the computer 2 or takes some other appropriate action.

Probes 7 may be logic analyzer probes if desired, since suitable probes and fixturing for monitoring the various popular busses is commonly available from the manufacturers of logic analyzers. Alternatively, dedicated probes could be developed for uses as probes 7. A cable 8 connects the probes 7 to an EISA card 9 installed in a computer 10 that may be either a PC or a workstation. The computer 10 runs software that parses the traffic on the bus to identify the read and write commands, identifies the block addresses associated therewith, and then assembles a CRC or checksum (confidence indicator) for the associated data. In the case of a write command the computed confidence indicator is stored (preferably as a value in a data structure) in a location in the memory of computer 10 corresponding to the block address. In the case of a read command the previously stored confidence indicator for that block is retrieved and compared to the computed confidence indicator. If they match, all is well. If they do not, then some action is needed.

The nature of the action depends on the particulars of the system using the bus. It may be possible to simply force a bus reset and cause the previous bus transaction to be repeated. Alternatively, it may be desirable for the computer 10 to have a communication path (shown as dotted line 11) to the computer 2 to alert it that an error has occurred. Communication path 11 could even indicate which block on which bus address was corrupt. Then, if the file system or space manager were equipped, or were modified, to do it, the suspect block could be re-read.

It may be the case that a read occurs for a block for which the monitor does not possess a previously stored confidence indicator. (Suppose, for example, that the monitor is installed on a bus having a disc that has already been in use.) This can be indicated by storing a special code (NOP—for "No OPeration") in the location for every block during an initialization of the monitor. When, pursuant to a read on the bus 4, the monitor retrieves the special code it declines to declare a mismatch. But as additional locations on the disc are accessed (which could be either written to or read from, as desired), the special codes in the corresponding locations in the memory of the monitor are replaced with genuine confidence indicators that are then used in the manner described above. The memory of the computer 10 could either be arranged to be non-volatile, or, periodically saved to its own mass storage device 14 so that the collected confidence indicators can be preserved during periods of time when the computer 10 is turned off.

It will be appreciated that there might be more than one disc 5 on the bus 4. This is easily handled by associating the bus addresses of the different discs with the transmitted block addresses Also, if after a period of time the bus address of a disc in use is changed, some mechanism in the monitor must be available to adjust to the change. A preferred way of accomplishing this is to maintain in the software of the monitor a programmable association between bus addresses and different segments of the data structure used to store confidence indicators as indexed therein by block address for the various bus addresses.

Figure 2:
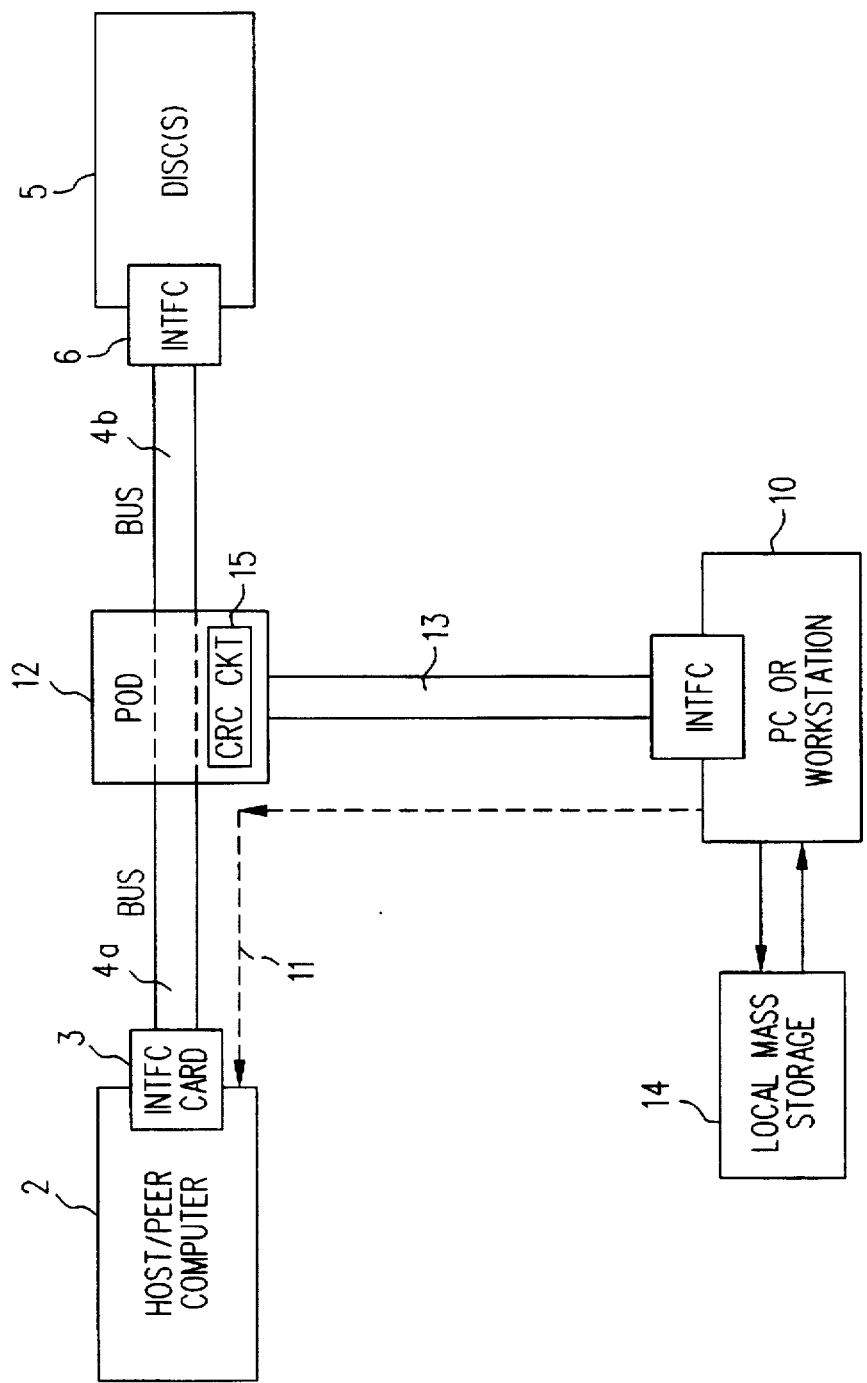
FIG. 2 is a simplified alternative block diagram of a passive bus monitor that detects data corruption for block-oriented data storage.

FIG. 2 illustrates an alternate embodiment for connecting the monitor to the bus 4a and 4b. In this arrangement a pod 12 is placed in series with the bus between the computer 2 and the disc 5. The connection 13 between the pod 12 and computer 10 can be any convenient arrangement, which includes a separate instance of another bus the same as, or a different type than, bus 4. The use of a pod 12 as in FIG. 2 affords the advantage of allowing a dedicated hardware mechanism 15 (still possibly microprocessor based, however) to undertake the parsing of the bus traffic and the computation of the comparison confidence indicators. A variety of hardware circuits suitable for parsing the bus traffic and for high-speed computation of checksums and CRC's are well known in the art. These include, but are not limited to, custom integrated circuits, PLA's, state machines, dedicated asynchronous logic, with any or all of these strategies including counters, registers, busses, flip-flops and assorted various gates. In this embodiment the computer 10 serves principally as a way to implement the store of original confidence indicators. It is a matter of choice as to where to locate the operation that checks the comparison confidence indicators against the originals, although it may be more flexible and convenient to do that operation in computer 10 with software that is part of the monitor.

Figure 3:
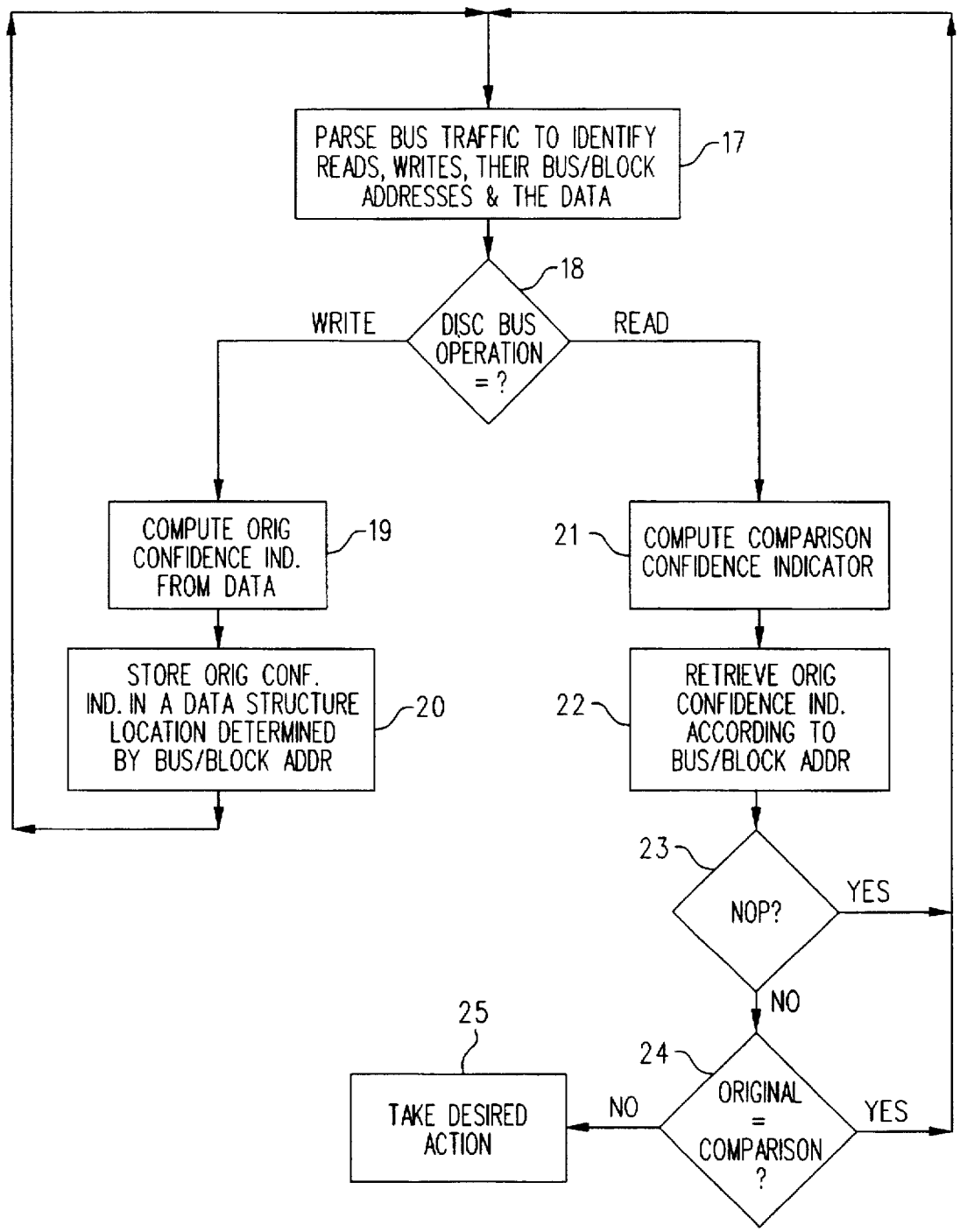
FIG. 3 is a simplified flow chart describing the internal operation of the passive bus monitors of FIGS. 1 and 2.

Refer now to FIG. 3, and consider the flow chart 16 shown therein. It is a simplified depiction of the internal operation of the passive bus monitoring arrangements shown in FIGS. 1 and 2. As for FIG. 1, flow chart 16 describes the operations performed by the software executed by computer 10. Element 17 is the activity of parsing the traffic on the bus 4. For FIG. 2 this activity is most conveniently located in pod 12.

Decision 18 directs the next activity to be 19 in the case of a write operation, and 21 in the case of a read. What activity 19 does is compute an original confidence indicator from the data in the addressed block associated with the write operation parsed at 17. For FIG. 2 activity 19 is performed by the CRC Circuit 15. At activity 20 the original confidence indicator computed at 19 is stored in a data structure at a location therein determined by the bus/block address. It will be understood that the "bus" portion of the bus/block address amounts to which disc, if there is more than one. If there is not more than one then it may well be that the bus portion is ignored and the bus/block address turns into just the block address.

In the case of a read, activity 21 computes from the data associated with that read a comparison confidence indicator. This activity is located in the pod 12 in FIG. 2. Activity 22 retrieves the original confidence indicator (earlier stored by activity 20). In FIG. 2 activity 22 is performed by software executing in the computer 10, as are the following activities 23 and 24. Activity 23 skips over any further processing if the original confidence indicator is a NOP. Activity 24 is a comparison between the original confidence indicator retrieved at 22 and the comparison confidence indicator computed at 21. If they agree control returns to activity 17 to await the next read or write operation. If they do not agree, then activity 25 is to take whatever action is desired. This corresponds, for example, to the line of communication 11 in FIGS. 1 and 2.

I claim:

1. A method of passively monitoring block-oriented data storage transactions on a bus, the method comprising the steps of:

connecting a monitor apparatus to a bus connecting a computer to a disc drive;

monitoring with the monitor apparatus the signals on the bus;

parsing the monitored signals to identify a write operation on the bus, its associated block address and the data for that addressed block; and then forming with the monitor apparatus an original confidence indicator from the data of the addressed block;

maintaining a data structure in the monitor apparatus;

storing the original confidence indicator in the data structure at a location therein corresponding to the block address;

parsing the monitored signals to identify a read operation on the bus, its associated block address and the data for that addressed block; and then forming with the monitor apparatus a comparison confidence indicator from the data of the addressed block;

retrieving the corresponding original confidence indicator from the data structure; and comparing the original and comparison confidence indicators for identity.

2. A method as in claim 1 wherein the original and comparison confidence indicators comprise cyclic redundancy check bits.

3. A method as in claim 1 wherein the block address includes an address portion that is a bus address of a disc drive connected to the bus.

* * * * *